April 15, 1941.　　　　C. W. THORNHILL　　　　2,238,758
MEANS FOR DETERMINING PHYSICAL CHARACTERISTICS OF LIQUIDS
Filed Dec. 20, 1937　　　4 Sheets-Sheet 1

INVENTOR
C. W. THORNHILL
BY
ATTORNEYS

April 15, 1941. C. W. THORNHILL 2,238,758
MEANS FOR DETERMINING PHYSICAL CHARACTERISTICS OF LIQUIDS
Filed Dec. 20, 1937 4 Sheets-Sheet 2

INVENTOR
C. W. THORNHILL
BY
ATTORNEYS

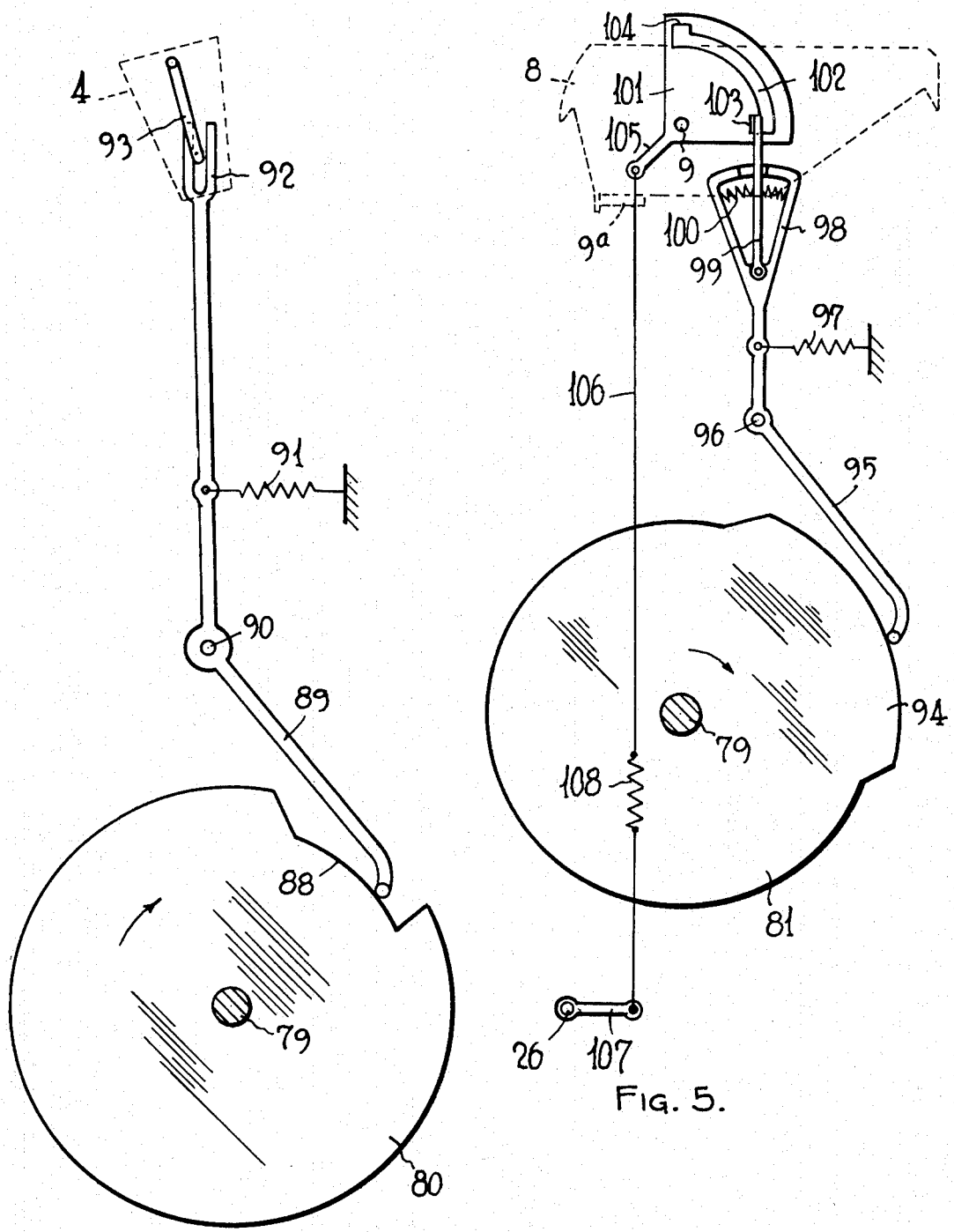

Patented Apr. 15, 1941

2,238,758

UNITED STATES PATENT OFFICE 2,238,758

MEANS FOR DETERMINING PHYSICAL CHARACTERISTICS OF LIQUIDS

Charles W. Thornhill, Houston, Tex.

Application December 20, 1937, Serial No. 180,709

8 Claims. (Cl. 265—2)

This invention relates to apparatus for determining the physical characteristics of liquids and more particularly to continuously operating apparatus for automatically and periodically determining both the relative viscosity of a liquid and the weight of a given volume thereof.

The invention has special utility when applied to the obtaining of continuous readings showing the viscosity and weight of drilling mud occurring in oil wells and the like during the boring thereof, as the nature of this mud has an important bearing on the drilling operation. The invention is, however, of course, not limited to this use but is also applicable to determining the viscosities and weights of other liquids such as lubricating oils, fuel oils and the like.

An object of the invention is to devise automatic time controlled apparatus which will operate to periodically indicate the viscosity and weight of samples of a liquid continuously passing through the same.

Another object is to devise apparatus of this character which embodies a chart or sheet on which a record of the relative viscosity and weight of successive samples is automatically made.

A further object is to provide apparatus of this character which shall be simple in construction and positive, accurate and efficient in operation.

In order that the invention may be readily understood, reference is had to the accompanying drawings forming part of this specification, and in which—

Figs. 5 and 6 are elevations on an enlarged scale showing two of the cams and associated parts which are operated by the time controlled mechanism illustrated in Fig. 2.

Figure 1:
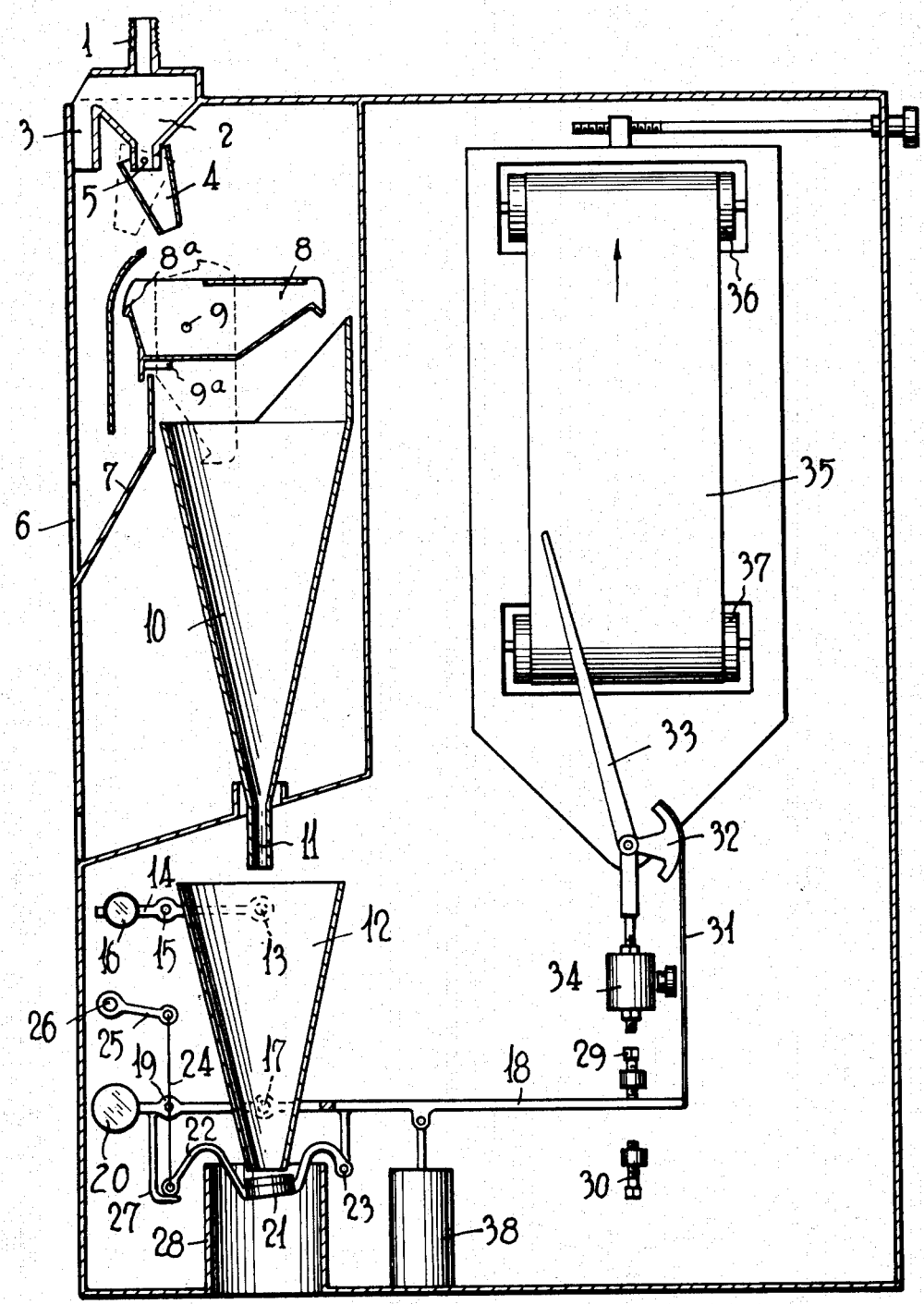
Fig. 1 is a vertical section through my improved viscosimeter, parts being shown in elevation and some of the mechanism being omitted.

Referring to the drawings in detail, and first more particularly to Fig. 1, my improved apparatus is enclosed in a suitable casing at the top of which is an inlet pipe 1 through which the liquid to be tested is introduced. This pipe discharges into a hopper 2 provided with an overflow 3, and below this overflow is a deflector 7 associated with an opening 6 in the side of the casing, through which opening the excess liquid may escape.

Pivotally connected to the bottom or discharge end of the hopper 2 as by means of a pivot 5, is a discharge spout 4 which is capable of occupying either one of two positions as shown in full and dotted lines. When in the dotted line position, the liquid issuing from the hopper and spout is discharged down upon the deflector 7 and out through the opening 6, while, when it is shifted to full line position, the material from the spout 4 is directed into a measuring vessel 8 mounted below the same. This vessel 8 is pivotally supported as at 9, and is provided near its top with an overflow or spillway 8a, so positioned that the liquid flowing over the same falls upon the deflector 7 and is discharged through the opening 6.

When filled to the overflow, the measuring vessel 8 is tilted about its pivot 9, as hereinafter described, and its contents dumped into a funnel-shaped receptacle 10, having at its lower end a restricted discharge passage 11.

Disposed immediately below this discharge passage 11 is a second container or receptacle 12, likewise shown as of conical shape. This receptacle 12 is supported by and pivotally connected as at 13 and 17 with two levers 14 and 18, pivoted at 15 and 19 respectively, and provided at their opposite ends with counterweights 16 and 20 respectively. Thus this receptacle 12 floats on the levers 14 and 18, the counterweights 16 and 20 being of such value as to maintain the levers normally in substantially horizontal position as shown.

The lower end of the receptacle 12 is adapted to be closed by a valve 21 carried by a lever 22, pivoted at 23 to an arm projecting from the lever 18. The opposite end of the lever 22 is connected by a wire or cable 24 with one end of a lever 25 rigidly secured to a shaft 26. It will be noted that the wire or cable 24 lies substantially in the plane of the pivot 19, and thus an upward pull on this wire or cable, such as is necessary to close the valve 21, has no tendency to swing the lever 18 upon the pivot 19. A bracket or stop 27 projects downwardly from the lever 18 near its pivot to limit the movement of the valve 21 when released.

Below the valve 21 is a discharge conduit 28 extending through the bottom wall of the casing, and the lever 22 is curved at each side so as to extend over the upper edge of this conduit.

The right hand end of the lever 18 plays between a pair of adjustable stops 29 and 30 and is connected to a strap 31 which passes around the arcuate face of a lever 32 rigidly secured to a pivoted stylus 33, having an adjustable counterweight 34 at its lower end. It will be understood that when the lever 18 moves downwardly, the stylus 33 is swung upon its pivot so that its upper end moves to the right.

Disposed behind or beneath the stylus 33 is a chart or record sheet 35 shown as in the form of an elongated strip supported at its ends on rollers 36 and 37. As hereinafter described, the roller 36 is driven so that the sheet 35 travels upwardly in the direction of the arrow at a uniform rate. A dash pot 38 is preferably provided in order to damp the movements of the lever 18.

Figure 2:
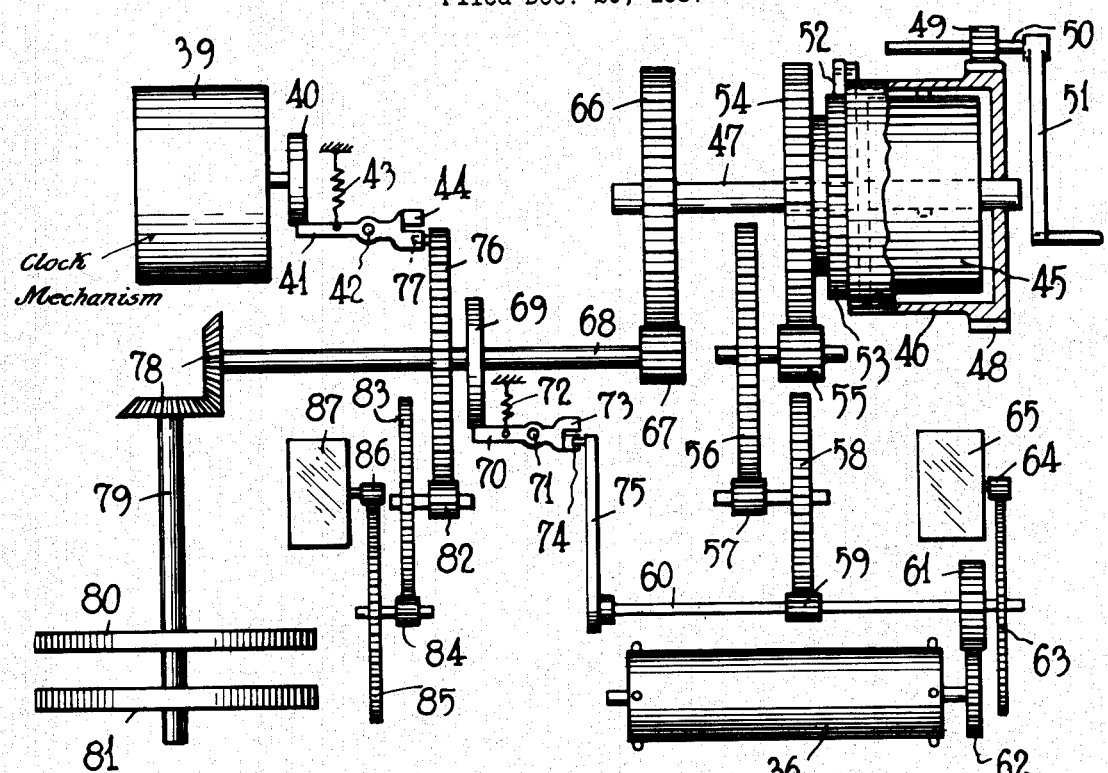
Fig. 2 is a plan view of the time controlled mechanism which I employ for automatically starting, stopping and operating my improved viscosimeter, parts being broken away and parts being shown in section, and other parts being omitted.

In connection with the general organization of parts shown in Fig. 1, I employ the time controlled mechanism illustrated in Figs. 2, 3, 5, and 6. Referring to Fig. 2, 39 designates a timing device such as an ordinary clock mechanism, and this drives at relatively slow speed a cam 40. A lever 41 pivoted at 42 is pressed by a spring 43 against the periphery of this cam, and at the opposite end of the lever 41 are a pair of spaced pallets 44, the purpose of which will be hereinafter described.

Power for operating the time controlled mechanism is furnished by a heavy coiled spring 45 wound around a shaft 47 and enclosed within a housing 46, one end of the spring being secured to the shaft and the other end to the housing. This housing is provided with gear teeth 48 cooperating with a pinion 49 mounted on a shaft 50 to which is secured a crank handle 51, by means of which the spring may be wound.

Power from the drum or housing 45 is transferred by means of a pawl 52 to a ratchet wheel 53 rigidly secured to a gear 54, loose on the shaft 47. The gear 54 meshes with a pinion 55 which in turn drives a gear 56, meshing with a pinion 57, driving a gear 58 meshing with a third pinion 59 on a shaft 60. Rigidly secured to this shaft is a gear 61 meshing with another gear 62, rigidly secured to the roller 36 which drives the record sheet 35 (see Fig. 1). A fly comprising gears 63, 64, and a vane 65 are connected with the shaft 60 to retard the movement thereof.

Figure 3:
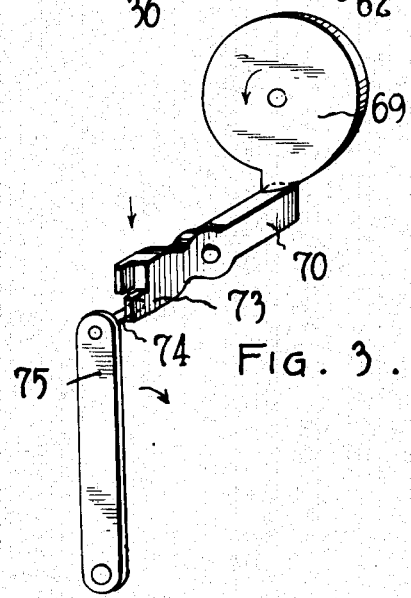
Fig. 3 is a fragmentary perspective view showing some of the details illustrated in Fig. 2.

Rigid with the shaft 47 is a gear 66, meshing with a pinion 67 on a shaft 68 carrying a cam 69, more clearly shown in Fig. 3. A lever 70 is pivoted at 71 and is held against the cam 69 by means of a spring 72, the opposite end of said lever carrying a pair of spaced pallets 73. A pin 74 set into a lever 75, rigidly mounted on the shaft 60 is adapted to engage these pallets.

Also secured to the shaft 68 is a gear 76 from which projects a pin 77 adapted to be engaged by the pallets 44. The gear 76 meshes through gears 82, 83, and 84 with another fly comprising the gears 85 and 86 and the vane 87 in order to control and retard the speed of the shaft 68.

Through bevel gears 78 the shaft 68 drives another shaft 79 on which are rigidly mounted a pair of cams 80 and 81, the shape of which is clearly shown in Figs. 5 and 6.

Referring to these latter figures, the cam 80 has a notch 88, and a lever 89 pivoted at 90 is pressed into engagement with the periphery of this cam by means of a spring 91. The opposite end of this lever is bifurcated as shown at 92 and engages over a bar 93 secured to the pivoted spout 4 (see Fig. 1). As the end of the lever 89 rides into and out of the notch 88 it will be apparent that the spout will be rocked on its pivot and shifted from one position to the other.

The other cam 81 has a projecting portion 94, and a lever 95 pivoted at 96 is urged by a spring 97 into engagement with the periphery of this cam. At the upper end of this lever is a triangular frame 98 in which is pivotally mounted a latch 99, which latch is yieldingly held in its central position by means of a pair of springs 100.

To the pivoted measuring vessel 8 (see Fig. 1) is rigidly secured as shown in Fig. 5, a bracket 101 having an arcuate slot 102, concentric with the pivot 9, this slot having locking notches 103 and 104 at its opposite ends. The latch 99 is adapted to engage these notches. It is shown in Fig. 5 as in engagement with the notch 103, thus locking the measuring vessel 8 in its normal or upright position. As the lever 95 rides off of the projection 94 of the cam 81, the latch 99 will be swung to the right out of engagement with the notch 103, thus permitting the vessel 8 to tilt and dump, and the latch will then engage in the notch 104, locking the vessel in dumped position until, by further movement of the cam, the parts are again restored. In this connection it may be explained that a counterweight 9a is secured to the bottom of the vessel 8 at one side of the pivot as shown in Fig. 1. This counterweight normally tends to move the vessel to the position shown in full lines. When, however, the vessel is filled with liquid, it tends, owing to its special shape, to tilt toward the right, the weight of the liquid then overbalancing the counterweight 9a. After the liquid has been dumped, however, and the latch 99 released from the notch 104, the counterweight 9a serves to return the vessel to its normal position.

An arm 105 projects from the bracket 101 and is connected by means of a wire or cable 106 to a lever 107, likewise rigidly secured to the shaft 26, a tension spring 108 preferably being interposed in this cable to act as a cushion. It will thus be clear that when the vessel 8 tilts on its pivot, an upward pull is exerted on the cable 106, which through the lever 107, shaft 26, and lever 25, exerts a similar upward pull on the cable 24 and thus closes the valve 21 (see Fig. 1).

The general operation of the apparatus will now be briefly described.

The liquid to be tested being constantly fed into the pipe 1 and the clock mechanism 39 running continuously, the cam 40 will periodically rock the lever 41 on its pivot so as to release the pin 77 from one of the pallets 44. The shaft 68 thereupon under the influence of the spring 45 begins to turn, thus operating the cams 80 and 81. The lever 89 had been resting in the notch 88 of this cam, and when the cam starts up, this lever moves to the high part of the cam, thus swinging the spout 4 to its left hand or dotted line position in which it directs the stream of liquid onto the deflector 7. After a short interval, during which the liquid in the vessel 8 settles to the level of the overflow, thus accurately measuring a predetermined volume, the lever 95 rides off of the high part of the cam 94 and disengages the latch 99 from the notch 103, releasing the vessel 8 and permitting it to tilt into dotted line position as shown in Fig. 1. When thus tilted, its contents are dumped into the receptacle 10.

Just prior to the tilting of the vessel 8, the cam 69 swings the lever 70 about its pivot and disengages the pin 74 from one of the pallets 73, thus permitting the spring 45 to drive the roller 36 and cause the record sheet 35 to travel at a uniform rate.

Figure 4:
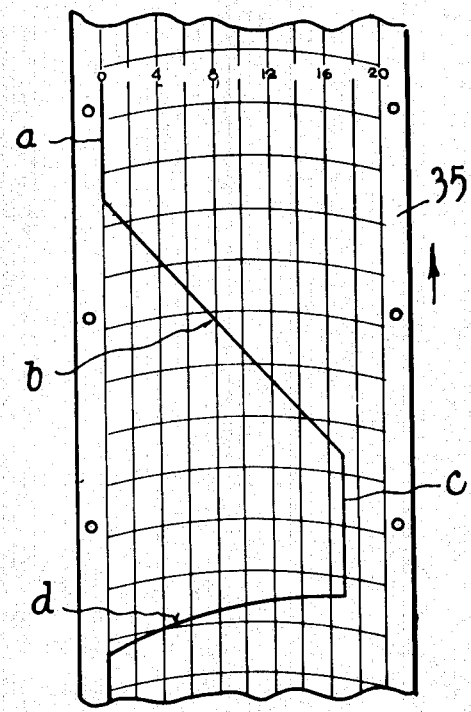
Fig. 4 is a fragmentary view of the chart or graph produced by my improved apparatus.

The liquid flows from the receptacle 10 through the restricted discharge opening 11 at practically a uniform rate into the receptacle 12, the valve 21 meanwhile having been closed as above described by the tilting of the vessel 8. As soon as the liquid begins to accumulate in the receptacle 12, its weight, acting upon the lever 18, begins to move the stylus 33 toward the right. In view of the fact that the record sheet 35 is traveling at constant speed, and in view of the further fact that the liquid is flowing into the receptacle 12 at a practically uniform rate, the line or graph produced upon the record sheet 35 will be substantially a straight line $b$, inclined to the direction of movement of the record sheet. It will be seen that the distance the sheet travels during the tracing of this line $b$ depends upon the relative speeds of movement of the record sheet and of the stylus. The speed of the record sheet being constant, the distance the sheet will travel during the flow through the discharge passage 11 depends upon the rate at which the liquid flows through this discharge passage and into the receptacle 12. As is well known, this rate of flow varies with the viscosity of the liquid. Hence, the distance traveled by the sheet during the tracing of the line $b$ in Fig. 4 is an indication of the relative viscosity of the liquid expressed in seconds or other units of time required for a predetermined volume to pass through a known opening.

As the weight of the receptacle 12 increases, due to the progressive accumulation of the liquid therein, the stylus 33 moves further and further to the right. When, however, all of the liquid dumped into the receptacle 10 has flowed out through the passage 11, there is no further change in weight of the contents of the receptacle 12, and the stylus remains stationary. The final displacement of the stylus laterally of the record sheet is therefore an indication of the total weight of the given volume of liquid which was dumped into the receptacle, and as the record sheet continues to travel the stylus, when in this weight indicating position, will trace a straight line parallel to the direction of movement of the sheet.

After the cams 80 and 81 have made a complete revolution, the pin 77 again engages one of the pallets 44 and stops the further rotation of the gear 76 and associated mechanism. Meanwhile, however, the lever 89 has again dropped into the notch 88 to return the spout 4 to its full line position and the lever 95 has again ridden up upon the projection 94 and has released the latch 99 from the notch 104, thus permitting the counterweight 9a to return the vessel 8 to horizontal position. As it moves to this position it releases the tension on cable 106, and this in turn, through lever 25 and cable 24, permits the lever 22 and valve 21 to drop, as shown in Fig. 1, thus discharging the contents of the receptacle 12 through the discharge conduit 28. As the liquid runs out of the receptacle 12, it grows progressively lighter and the counterweight 20 tends to lift the right hand end of the lever 18, thus permitting the stylus 33 to swing back toward the left.

Finally, after the arm 75 has made a complete revolution, the pin 74 again engages one of the pallets 73 and is stopped thereby. The record sheet thereupon comes to rest and remains stationary until the cycle is repeated by the clock mechanism 39.

Referring to Fig. 4, I have illustrated a section of the graph or chart produced by the recording mechanism shown in Fig. 1. In this graph the straight portion $a$ of the curve is produced after the sheet has begun to run but before any liquid has flowed into the receptacle. The inclined portion $b$ of the graph is the part which is produced while the liquid is running out of the receptacle 10 and into the receptacle 12, and the distance traveled by the sheet during the tracing of this part of the line is proportional to the rate of flow, that is to say, to the viscosity of the liquid. The parallel portion $c$ of the line represents the part which is traced after the stylus has moved to its right hand limit and come to rest. The lateral displacement of this part of the line from the left hand margin of the chart indicates the weight of the measured volume of liquid and provides a means for determining the density of the liquid. The portion $d$ of the graph indicates the part that is produced after the valve 21 is opened and the stylus swings back to normal position.

Figure 7:
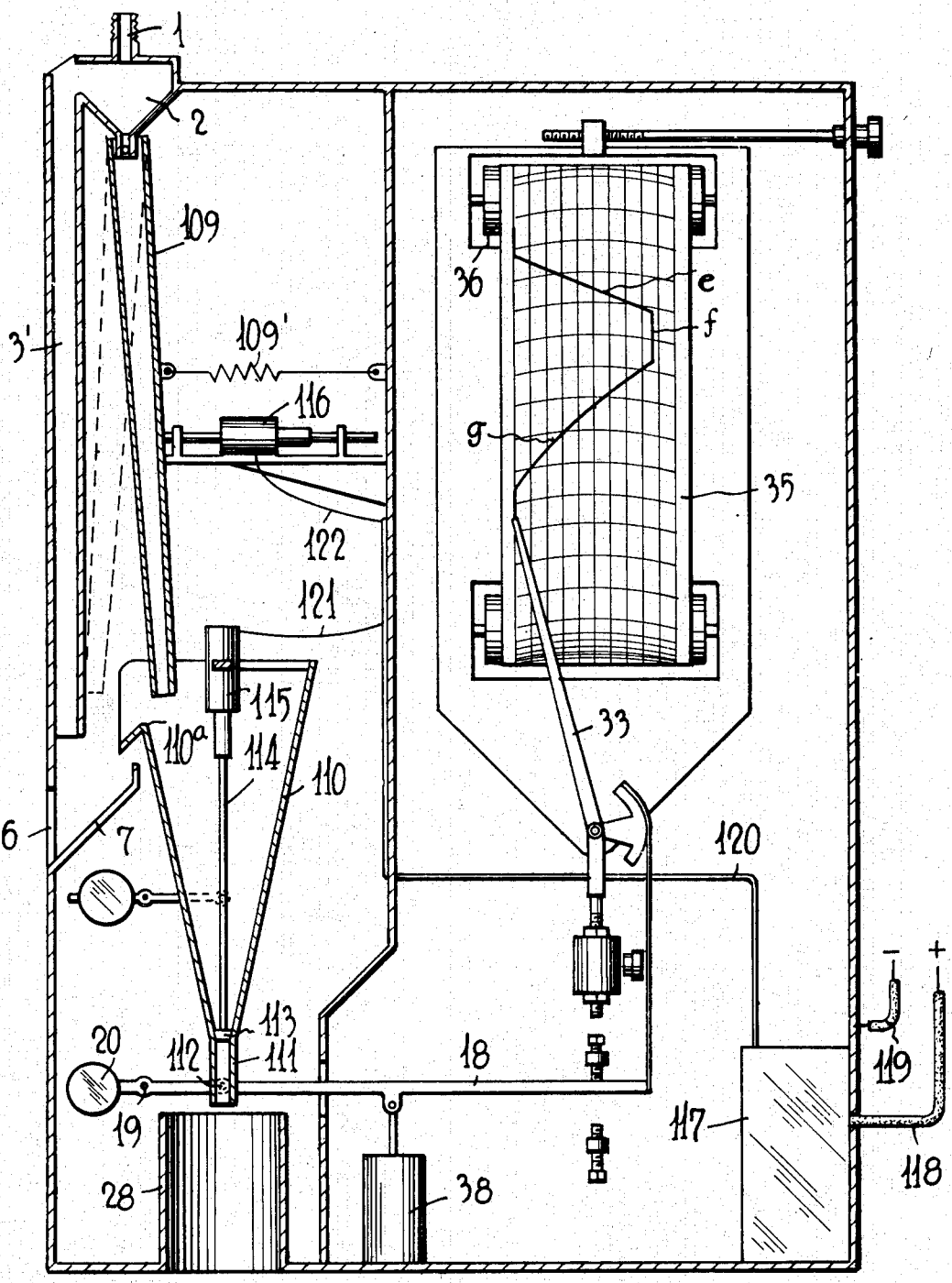
Fig. 7 is a view similar to Fig. 1, but showing a somewhat modified arrangement.

In Fig. 7 I have shown a slightly modified arrangement which may be successfully used in connection with certain types of liquids. In this figure, instead of the short swinging spout 4 and measuring vessel 8, I employ a long spout or conduit 109 which, when swung to full line position by means of the spring 109' is adapted to deliver the liquid into a receptacle 110, having at its lower end a restricted discharge passage 111 normally closed by means of a valve 113. The receptacle 110 is pivotally supported at 112 on the lever 18 as before.

The valve 113 is carried by a stem 114, the upper end of which is secured to the plunger of a solenoid 115. The receptacle 110 has an overflow or spillway 110a, so that an accurate measurement of its contents may be made.

Adjacent the swinging spout 109 is another solenoid 116, the plunger of which carries a rod adapted to push against the side of the spout 109 and swing it to the left.

117 designates an automatic time switch to which current is fed from a suitable source by a lead 118, the other lead 119 being grounded to the frame of the apparatus. A cable 120 extends from the switch mechanism 117 and this cable contains wires 121 and 122 leading respectively to one end of the windings of solenoids 115 and 116, the other ends of these windings being grounded to the frame.

The timing device in the switch mechanism 117 is such that after the spout 109 has been pushed over to dotted line position by the solenoid 116, and a short interval allowed for the liquid in the receptacle 110 to settle to the level of the overflow, the solenoid 115 is energized so as to open the valve 113 and permit the liquid to flow out of the receptacle 110.

In the graph made by this form of the invention, the first inclined portion $e$ of the curve indicates the part that is formed while the receptacle 110 is filling up. The parallel portion $f$ indicates as before the total weight of the given volume of liquid, while the reversely inclined portion $g$ is formed after the valve 113 is opened and while the liquid is escaping through the restricted discharge opening 111. The distance traveled by the sheet during the tracing of this portion g of the curve is therefore dependent upon the rate of flow of the liquid through this passage, and consequently serves to indicate its viscosity.

This form of the invention can be used only with non-settling and non-jelling liquids since settling or jelling would interfere with the operation of the valve 113. In the first described embodiment of the invention, however, settling and jelling are broken up when the measuring vessel 8 is dumped.

What I claim is:

1. Apparatus for determining the relative viscosity of liquids comprising a receptacle into which a predetermined volume of the liquid to be tested is deposited, said receptacle having a restricted discharge passage, and means for indicating both the total weight of said predetermined volume, and the rate of flow of such volume from said receptacle through said passage.

2. Apparatus for determining the relative viscosity of liquids comprising a receptacle into which a predetermined volume of the liquid to be tested is deposited, said receptacle having a restricted discharge passage, a single chart, and means for indicating on said chart both the total weight of said predetermined volume, and the rate of flow of such volume from said receptacle through said passage.

3. Apparatus for determining the relative viscosity of liquids comprising a receptacle into which the liquid to be tested is fed, said receptacle having a restricted discharge passage, a movable chart and time controlled means for driving the same, a stylus for recording on said chart, and means responsive to the total weight of the liquid which at any given instant has escaped through said passage, for controlling the position of said stylus.

4. Apparatus of the class described comprising a movable spout through which the liquid to be tested flows continuously, a measuring receptacle, a second receptacle having a restricted discharge passage, and time controlled means for periodically first so moving said spout as to direct the stream of liquid into said measuring receptacle for a predetermined interval, to fill it; then moving said spout so as to direct the stream away from said measuring receptacle; and subsequently dumping the measured quantity of liquid from said measuring receptacle into said second receptacle having a restricted discharge passage.

5. Apparatus of the class described comprising a movable spout through which the liquid to be tested flows continuously, a measuring receptacle, means having a restricted passage, time controlled means for periodically first shifting said spout so as to direct the stream of liquid for a predetermined interval into said measuring receptacle, to fill it, and then discharging said measured quantity of liquid through said restricted passage, and recording means for recording the rate at which it flows through said restricted passage.

6. Apparatus of the class described comprising a pipe through which the liquid to be tested flows continuously, means having a restricted passage, and time controlled means for periodically separating out a measured sample of said liquid, and causing it to flow through said restricted passage, and means for recording both the rate of flow through said restricted passage and total weight of each successive sample.

7. In a viscosimeter, a member having a restricted passage for a material to be tested, means for indicating the rate of flow through said passage comprising a weight indicating device including an indicator element, a balanced pivoted lever connected with said element, a receptacle supported on said lever, an outlet valve at the bottom of said receptacle, and mechanical means outside of said receptacle for operating said valve without exerting any force tending to unbalance said lever.

8. In a viscosimeter, a member having a restricted passage for a material to be tested, means for indicating the rate of flow through said passage comprising a weight indicating device including an indicator element, a balanced pivoted lever connected with said element, a receptacle supported on said lever, an outlet valve at the bottom of said receptacle carried by a second lever pivoted on said first lever, and means for operating said second lever to close said valve without applying any unbalancing force to said first lever.

CHARLES W. THORNHILL.